(12) United States Patent
Martin et al.

(10) Patent No.: US 6,646,957 B2
(45) Date of Patent: Nov. 11, 2003

(54) TELEPHONE WATCH INCLUDING A SIM CARD IN ITS HOUSING

(75) Inventors: Jean-Claude Martin, Neuchâtel (CH); Dominique Dubugnon, Etoy (CH)

(73) Assignee: Asulab S.A. (CH)

( * ) Notice: Subject to any disclaimer, the term of this patent is extended or adjusted under 35 U.S.C. 154(b) by 0 days.

(21) Appl. No.: 09/771,528

(22) Filed: Jan. 29, 2001

(65) Prior Publication Data

US 2001/0014055 A1 Aug. 16, 2001

(30) Foreign Application Priority Data

Feb. 16, 2000 (CH) .................................................. 0304/00

(51) Int. Cl.[7] ........................... G04B 47/00; G04B 45/00
(52) U.S. Cl. ........................................... 368/10; 368/281
(58) Field of Search ........................ 368/10, 281, 282, 368/276; 455/550, 558

(56) References Cited

U.S. PATENT DOCUMENTS

| 5,323,364 | A | * | 6/1994 | Hayashi et al. ............. 368/276 |
| 5,564,096 | A | | 10/1996 | Hama et al. |
| 5,598,383 | A | * | 1/1997 | Li ............................... 368/291 |
| 5,603,629 | A | * | 2/1997 | DeFrasne et al. ........... 439/326 |
| 5,699,406 | A | * | 12/1997 | Liikanen et al. ............ 455/558 |
| 5,780,836 | A | * | 7/1998 | Iguchi et al. ............... 235/486 |
| 5,831,256 | A | * | 11/1998 | De Larminat et al. ...... 455/558 |
| 5,907,814 | A | * | 5/1999 | Jubert ......................... 455/550 |
| 5,937,359 | A | * | 8/1999 | Jubert ......................... 455/550 |
| 6,062,889 | A | * | 5/2000 | Hyland et al. .............. 439/326 |
| 6,224,254 | B1 | * | 5/2001 | Hayek et al. ............... 368/281 |
| 6,459,890 | B1 | * | 10/2002 | Kim ............................ 368/204 |

FOREIGN PATENT DOCUMENTS

| DE | 4029517 A1 | | 9/1990 | |
| DE | 4112679 A1 | * | 10/1992 | ................. 368/276 |
| DE | 29809862 U1 | | 6/1998 | |
| JP | 5325461 | * | 3/1978 | ................. 368/276 |

* cited by examiner

Primary Examiner—David Martin
Assistant Examiner—Jeanne-Marguerite Goodwin
(74) Attorney, Agent, or Firm—Edward K. Robinson

(57) ABSTRACT

The telephone watch (1) includes a back cover (2) in which is arranged a housing (3) arranged to accommodate a SIM card (4). A cover (5) provided with a hinge (6) closes the back cover (2). Means are implemented to assure the sealing (8) of the cover (5) and to assure the locking thereof (7). The hinge (6) is arranged so as to be entirely confined within the back cover (2).

5 Claims, 1 Drawing Sheet

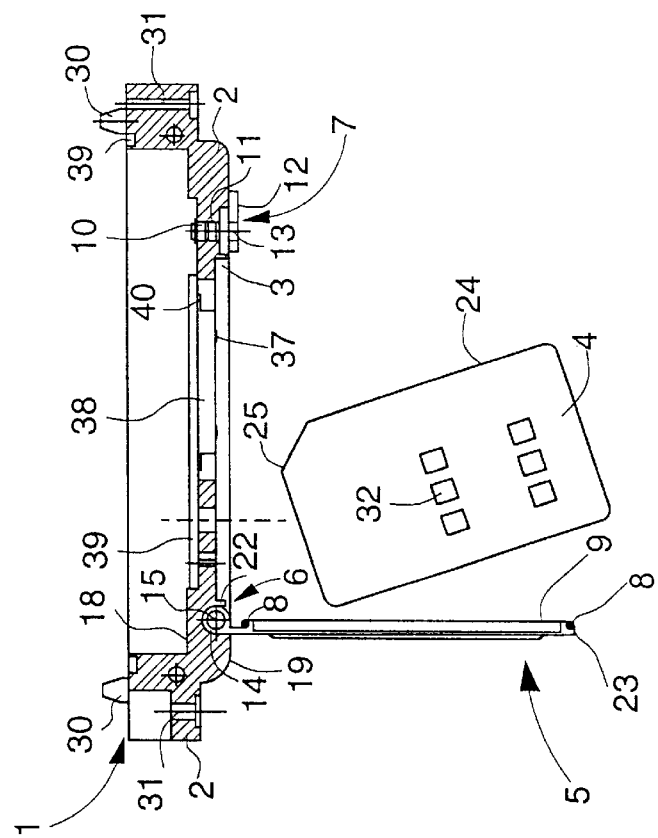
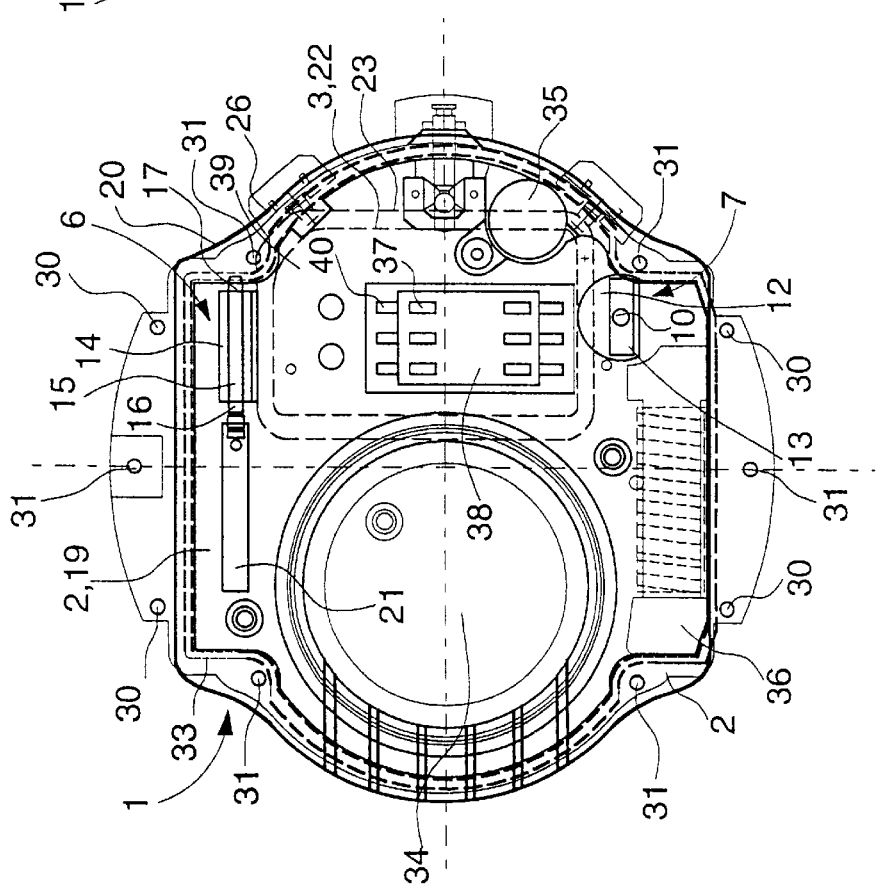

TELEPHONE WATCH INCLUDING A SIM CARD IN ITS HOUSING

The present invention relates to a telephone watch intended both to display the time and to be used in a mobile communication system, this watch including a case formed of a crystal, a middle part and a back cover, a housing made in the back cover capable of accommodating, in a removable manner, a SIM (Subscriber Identity Module) card allowing access to the mobile communication system and a cover closing the housing, this cover being attached to the back cover by means of a hinge.

German Utility Module No. 298 09 862 U1 and, more particularly, FIG. 2 thereof discloses a general outline of a telephone watch as explained in the above paragraph. However, the description is very succinct. Indeed, the telephone wristwatch of this document shows, in FIG. 2 thereof, a top view of a case containing a SIM card occupying the entire space available, this case being closed by a cover. The hinge of the cover on the case remains visible when the cover is closed. The drawing does not show where the time-keeping part of the watch and the display thereof is housed. Moreover, no measures seem to be taken to assure the sealing of the watch and the system for locking the cover in the closed position is not shown. Further the slanting corner or polarising slot of the SIM card is not used advantageously to save space. It will be understood that all the details which have just been listed are important if one wishes to provide a product which operates reliably, has a pleasing appearance and reasonable volume.

The present invention thus proposes to overcome the problems referred to above while satisfying the generic definition given in the first paragraph of this description.

Thus the telephone watch of the present invention is characterised in that means are implemented to assure the sealing of the cover with respect to the housing when said cover is hinged down under the back cover and is held there by means of a locking system and in that the hinge is arranged to be confined in the back cover, this hinge being thus completely hidden from the sight of the wearer of the watch.

The features and advantages of the invention will appear from the following description, made with reference to the annexed drawings and giving by way of explanatory but non-limiting example, an advantageous embodiment of the invention, in such drawing:

FIG. 1 is a plane view of the back cover part of the telephone watch of the invention; and FIG. 2 is a cross-section in the plane view of FIG. 1, and a view of the SIM card intended to be incorporated in the back cover.

As is seen in FIGS. 1 and 2, the telephone watch intended both to display the time and to be used in a mobile communication system includes a case 1 formed of a crystal, a middle part and a back cover 2. In FIGS. 1 and 2 only back cover 2 is shown. It will be understood that this back cover 2 is fitted under a middle part carrying a crystal, the middle part enclosing, amongst other elements, the clockwork movement and the crystal allowing the time display hands to appear and bearing a keyboard intended for dialing telephone numbers. FIG. 2 shows projecting portions 30 which allow back cover 2 to be centred and positioned under the middle part and passages 31 enabling back cover 2 to be secured to the middle part by means of screws. A groove 33 is made at the location where back cover 2 is joined to the middle part. This groove is intended to accommodate a sealing gasket which is not shown.

The telephone watch also includes in its back cover 2 a loud speaker or earpiece 34 as well as a microphone 35. A coil 36, excited from a distance by an independent charger, provides the recharging power to an accumulator which is not shown but which is housed in back cover 2.

The Figures show that a housing 3 is made in back cover 2. This housing is capable of accommodating, in a removable manner, a SIM card 4, (an abbreviation of Subscriber Identity Module), allowing access to the mobile communication system. When the SIM card is in housing 3, the terminals 32 of the SIM card 4, are in contact with strips 37 forming part of a connector 38 bonded onto a printed circuit 39 by means of lugs 40.

A complete description of such a SIM card will not be given here, since it is known from numerous publications and standardised by international standards, in particular the ISO/IEC 7810, 7816/1 and 7816/2 standards. It will however be mentioned that the card used here has dimensions of the order of 25×15×0.8 mm. This card includes six terminals 32 connected internally to an electronic chip containing in particular data defining the mode of access to the mobile communication system. This SIM card 4 also includes a corner 25 cut obliquely also called a polarising slot which allows the orientation of said card to be defined. Finally, it will also be mentioned that this card allows the user to access the mobile communication system via an appropriate supplier or network operator. It also contains data defining the mode of access to said system and further allows complementary data relating to the user to be saved, such as a personal identification number and/or perhaps an address book of telephone numbers.

FIGS. 1 and 2 show that a cover 5 assures the closing of housing 3, this cover 5 being attached to back cover 2 by means of a hinge 6.

According to the invention and as the Figures show, means, which will be described in detail hereinafter, are implemented to assure the sealing or watertightness of cover 5 with respect to housing 3 when the cover is hinged down under back cover 2. The Figures also show that cover 5 is held under back cover 2 by means of a locking system 7 one embodiment of which will be described hereinafter.

Again according to the invention, FIG. 1 shows particularly well that hinge 6 is arranged so as to be entirely confined in back cover 2 so that, when the watch is worn on the wrist, this hinge is completely hidden from the sight of the wearer of the watch. The example of such an arrangement will be described in detail hereinafter.

As is seen in FIG. 2, the sealing of cover 5 with respect to housing 3 is assured by a sealing gasket 8 which goes all the way round inner face 9 of cover 5. This gasket 8 rests on back cover 2 and more particularly on the bottom of housing 3 when cover 5 is closed.

Locking system 7, which holds cover 5 closed on cover 3 will now be described. FIGS. 1 and 2 show a stem 10 which is held and which rotates freely in a hole 11 drilled in back cover 2. Stem 10 carries an eccentrically shaped head 12 the off-centre part of which is able to cap cover 5 in the locking position as is seen in FIG. 1. It will be noted that head 12 also carries a slot 13 in which a coin can be inserted to actuate the locking system.

FIG. 1 shows clearly how hinge 6 is arranged to be entirely confined within back cover 2 to completely elude the sight of the wearer of the watch. Cover 5 carries a hinge 14 fitted and able to pivot around a bar 15. Bar 15 is driven into first and second holes 16 and 17 made in the material of back cover 2 parallel to main faces 18 and 19 of said back cover 2. Bar 15 passes right through the first hole 16, while second hole 17 is blind and only accommodates the end of said bar. Bar 15 is thus prevented from appearing on side 20 of back cover 2, which would be deemed unsightly. The positioning and introduction of bar 15 in first and second holes 16 and 17 is made possible as a result of an open channel 19 made on inner face 19 of back cover 2 in alignment with bar 15. FIG. 1 shows that channel 19 is limited in length on the left side of the Figure so that it does not appear on the side of back cover 2 either. Thus, when the telephone watch is worn on the wrist none of hinge 6 can be seen.

FIG. 1 also shows a particular feature proposed by the invention which is arranging SIM card 4 in back cover 2 in a particular way and in order to save space. For this reason, housing 3 and cover 6 which covers the housing 3 each have a contour (referenced respectively 22 and 23) similar to contour 24 of SIM card 4. Thus, the housing and the cover also have a slanting corner similar to polarising slot 25 of the SIM card. FIG. 1 clearly shows that this slanting corner is arranged to be close to an oblique location 26 of side 20 of back cover 2. The peculiarity of the SIM card of having a slanting corner is thus used advantageously to reduce the space taken by the card, its housing and its cover in the back cover and thus to allow more space for the other components which have to be located in the back cover.

What is claimed is:

1. A telephone watch: having a time display and a mobile communication means, the telephone watch including; a case formed of a crystal, a middle part and a back cover, the time display and mobile communication means being encased in the middle part between the crystal and an inside surface of the back cover; the back cover includes; a housing adapted for removably receiving a SIM (Subscriber Identity Module) card, the housing being accessible through an opening in an outer surface of the back cover; a cover for closing the opening to the housing, a hinge for attaching the cover to the back cover, a sealing means for sealing the cover to the housing when said cover is hinged down under the back cover, and a locking system for locking the cover to the back cover and wherein the hinge is arranged to be confined in the back cover and hidden from the sight of a wearer of the telephone watch.

2. A telephone watch according to claim 1, wherein the cover includes an inner face with a shoulder around an outer circumference of the inner face and the sealing means comprises a sealing gasket located in the shoulder the sealing gasket resting on the back cover when the cover is hinged down under the back cover.

3. A telephone watch according to claim 1, wherein the back cover includes a hole and the locking system comprises: a stem freely rotatably held in the hole, the stem having an eccentric head for capping the cover in a locking position, said head further including a slot in which a coin can be inserted to actuate said locking system.

4. A telephone watch according to claim 1, wherein the hinge comprises: a bar located between and held in place by first and second holes in the back cover and parallel to the outer surface, with each hole receiving one end of the bar, the first hole being a through hole and the second hole being a blind hole to prevent the bar appearing on the side of the back cover.

5. A telephone watch according to claim 1, the SIM card having a standardised contour and wherein the housing and the cover have similar contours to the contour of the SIM card, the standardised contour including a polarising corner, said housing and cover being arranged to be close to an oblique location of the side of the back cover to limit the space taken by the housing, the cover and the SIM card when located within the housing.

* * * * *